US008215338B2

(12) United States Patent
Delattre et al.

(10) Patent No.: US 8,215,338 B2
(45) Date of Patent: Jul. 10, 2012

(54) METHOD FOR CONTROLLING THE PROGRESSION OF A FLUID IN A MICROFLUIDIC COMPONENT

(75) Inventors: Cyril Delattre, Grenoble (FR); Raymond Charles, Saint Jean De Moirans (FR); Patrick Pouteau, Meylan (FR)

(73) Assignees: Commissariat a l'Energie Atomique, Paris (FR); Bio Merieux, Marcy l'Etoile (FR)

( * ) Notice: Subject to any disclaimer, the term of this patent is extended or adjusted under 35 U.S.C. 154(b) by 900 days.

(21) Appl. No.: 12/223,059

(22) PCT Filed: Feb. 15, 2007

(86) PCT No.: PCT/FR2007/000275
§ 371 (c)(1),
(2), (4) Date: Jul. 22, 2008

(87) PCT Pub. No.: WO2007/093712
PCT Pub. Date: Aug. 23, 2007

(65) Prior Publication Data
US 2008/0314454 A1    Dec. 25, 2008

(30) Foreign Application Priority Data
Feb. 16, 2006  (FR) ..................................... 06 01375

(51) Int. Cl.
*A61M 5/168* (2006.01)
(52) U.S. Cl. ................ 137/599.06; 137/601.13; 137/833
(58) Field of Classification Search ............... 137/487.5, 137/599.01, 599.06, 599.09, 601.2, 601.13, 137/806, 825, 833; 96/101–106
See application file for complete search history.

(56) References Cited

U.S. PATENT DOCUMENTS

| 4,390,885 | A | * | 6/1983 | Shah et al. .................. 346/140.1 |
| 5,230,866 | A | | 7/1993 | Shartle et al. |
| 5,980,704 | A | * | 11/1999 | Cherukuri et al. ............. 506/33 |
| 6,296,020 | B1 | | 10/2001 | McNeely et al. |
| 7,041,068 | B2 | * | 5/2006 | Freeman et al. ............. 600/583 |
| 2003/0082081 | A1 | * | 5/2003 | Fouillet et al. ............... 422/105 |
| 2003/0190608 | A1 | | 10/2003 | Blackburn |
| 2004/0109793 | A1 | | 6/2004 | McNeely et al. |
| 2007/0157973 | A1 | * | 7/2007 | Chien et al. ............. 137/565.29 |

FOREIGN PATENT DOCUMENTS

| WO | WO 00/30751 | * | 6/2000 |
| WO | WO 01/04909 A1 | | 1/2001 |
| WO | WO 02/41995 A1 | | 5/2002 |
| WO | WO 03/098218 A1 | | 11/2003 |

* cited by examiner

*Primary Examiner* — Craig Schneider
*Assistant Examiner* — Jessica Cahill
(74) *Attorney, Agent, or Firm* — Oliff & Berridge, PLC

(57) ABSTRACT

The method for controlling the progression of a fluid, from upstream to downstream, in a microfluidic component comprising for example a plurality of microchannels each comprising a plurality of successive reaction or detection zones and a plurality of passive valves, controls the progression of the fluid in the microchannels by controlling the increase of a pressure difference between upstream and downstream of the component. The method controls the pressure difference increase discontinuously in the form of enabling pulses so as in particular to synchronize passing of the corresponding passive valves of the microchannels. The pressure difference is advantageously adjusted to a zero value between two successive enabling pulses.

13 Claims, 6 Drawing Sheets

METHOD FOR CONTROLLING THE PROGRESSION OF A FLUID IN A MICROFLUIDIC COMPONENT

BACKGROUND OF THE INVENTION

The invention relates to microfluidic components of the biochip type and more particularly a method for controlling the progression of a fluid from inlet to outlet of a microfluidic component, comprising at least one microchannel comprising a multiplicity of successive reaction or detection zones arranged at preset intervals, and a multiplicity of passive valves arranged between two successive reaction or detection zones, the method controlling the progression of the fluid in the microchannel by controlling the increase of a pressure difference between the inlet and outlet of the component.

STATE OF THE ART

In the field of medical analysis devices, more particularly that of Microsystems of the biochip and bioMicroElectroMechanicalSystems (bioMEMS) component type for biology and chemistry, the use of microfluidic components able to chain several steps of a particular biological protocol is known.

As represented schematically in FIG. 1, a microfluidic component 1 preferably comprises several microchannels 2 in which the fluid advances in parallel. Each microchannel 2 comprises reaction or detection zones 3 arranged for example at regular predetermined intervals. Reaction or detection zones 3 can in particular act as reaction chamber for the different steps of the biological protocol to be carried out, or they can act as mixing zone during progression of the fluid. Component 1 being previously empty, the fluid, or more particularly the fluid/gas interface, advances in microchannels 2 from upstream to downstream of component 1, i.e. from inlet to outlet of component 1, according to arrow F of FIG. 2 defining the direction of progression of the fluid.

Microchannels 2 also comprise passive valves 4, each arranged between two successive reaction or detection zones 3 and designed to temporarily impede the progression of the fluid in component 1. In the particular embodiment of FIGS. 1 to 3, component 1 for example comprises four microchannels 2, three series of reaction or detection zones 3a, 3b, 3c and three series of intermediate passive valves 4a, 4b, 4c. In FIGS. 1 to 3, passive valves 4a, 4b, 4c are represented by hatchings and are defined for example by a non-wetting portion of microchannels 2 able to impede the fluid. The portions adjacent to passive valves 4a, 4b, 4c are then wetting portions of microchannels 2 enabling flow of the fluid.

The U.S. Pat. No. 5,230,866 notably describes the operating principle of such a passive valve designed to control impeding of the fluid (represented in dark color in FIGS. 2 and 3) advancing due to the effect of an external pressure. A passive valve 4 only lets the fluid pass if the pressure difference between upstream and downstream of component 1 increases above a threshold value Ps proper to each passive valve 4 of component 1. Threshold value Ps generally depends on the geometric and wetting characteristics of the surface in contact with the fluid in passive valve 4. For example, operation of passive valve 4 is based on the principle of local change of capillary forces due to the abrupt variations of the surface properties, in particular the wettability or geometry, of microchannel 2.

A method for controlling the progression of the fluid in such a component 1 consists in increasing the pressure difference between upstream and downstream of component 1, so as to make the fluid advance from reaction or detection zones 3 to reaction or detection zones 3, the passive valves 4 of any one series, i.e. those arranged on the same vertical line in FIGS. 1 to 3, all being identical.

The method consists in increasing the pressure difference above threshold value Ps corresponding to passive valve 4 to be passed, and in then reducing the pressure difference to below corresponding threshold value Ps to make the fluid advance in the component.

However, imperfections on microchannels 2 of component 1 can lead to a passive valve 4 being passed before the others are passed. For example, as represented in FIG. 2, passive valve 4a preceding second reaction or detection zone 3b of second microchannel 2 has been passed before the others, notably because of the possible geometry and/or wettability imperfections of passive valve 4a. Second reaction or detection zone 3b is therefore filled before the other zones 3b of the same series.

As represented in FIG. 3, microchannel 2 keeps this stagger throughout the progression of the fluid, in particular if all the other passive valves 4a, 4b, 4c are operating normally as described above. Microchannel 2 corresponding to this passive valve 4a will therefore be filled more quickly than the others. This leads in particular to synchronization problems in the progression of the fluid, which affects performance of the biological steps, and to difficulties in analysis and subsequently in using the results. In particular, in the case where several passive valves 4 are defective, an accumulation of negative effects is observed leading to aberrations in terms of use of the results.

To remedy these shortcomings, the documents US 2004/0109793 and WO 02/41995 and U.S. Pat. No. 6,296,020 each describe a device for distributing fluid in different channels of a component 1, as described above, from a common inlet chamber, with passage from one reaction or detection zone to another reaction or detection zone on each channel. Control of the fluid passage is performed by passive valves arranged on outlet from the reaction or detection zones. The passive valves are arranged in such a way as to have increasingly high threshold values Ps from upstream to downstream of the device.

As represented schematically in FIG. 4, passive valves 4 are arranged in four series with increasing threshold values Ps1 to Ps4 from upstream to downstream of component 1. The method for controlling the fluid progression in component 1 then consists in increasing the pressure difference between upstream and downstream of the component in the form of pressure plateaus. The biological protocol step corresponding to each reaction or detection zone 3 is performed at constant pressure during each pressure plateau. Applying a pressure difference per plateau, up to a value just below threshold value Ps of corresponding passive valve 4, enables passive valve 4 to be passed and the fluid to be stopped against the next passive valve 4. In the case of several series of passive valves 4 in parallel, as represented in FIGS. 1 to 3, applying a pressure difference per plateau enables the whole set of passive valves 4 of the same series to be passed at the same time and the fluid to be stopped against the following series of passive valves 4.

This particular method described above prevents a passive valve 4 from preferentially yielding to the pressure and directly filling a whole microchannel 2 of component 1. However it is technologically difficult to chain realization of a large number of passive valves 4 with increasing threshold values Ps from inlet to outlet of component 1. Furthermore, miniaturization of such a component 1 is limited by imperatives of size beyond which the viability of component 1 is questionable.

Furthermore, the document WO 01/04909 also describes another type of microfluidic device comprising a plurality of parallel branches each having a reaction cell and a capillary valve. A high-pressure gas pulse makes the fluid pass through the valves of all the branches of the device.

No known multichannel microfluidic component therefore enables the above-mentioned shortcomings to be remedied, and in particular the problem of passive valves preferentially yielding to pressure more particularly observed in the steps linked to detection or reaction zones 3, which are the seats of chemical, biochemical or biological reactions.

OBJECT OF THE INVENTION

The object of the invention is to remedy all the above-mentioned shortcomings and to achieve a method for controlling the progression of a fluid in a microchannel of a microfluidic component improving existing control methods and providing reliability in use of the component, while at the same time being easy to implement whatever the characteristics of the passive valves of the component.

The object of the invention is achieved by the appended claims, and more particularly by the fact that the pressure difference increase is controlled discontinuously in the form of enabling pulses and by the fact that the pressure difference is reduced to a zero value between two successive enabling pulses.

Such a method then does not depend exclusively on the threshold pressure of the passive valves and can be applied to an unlimited number of valves of the same series.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
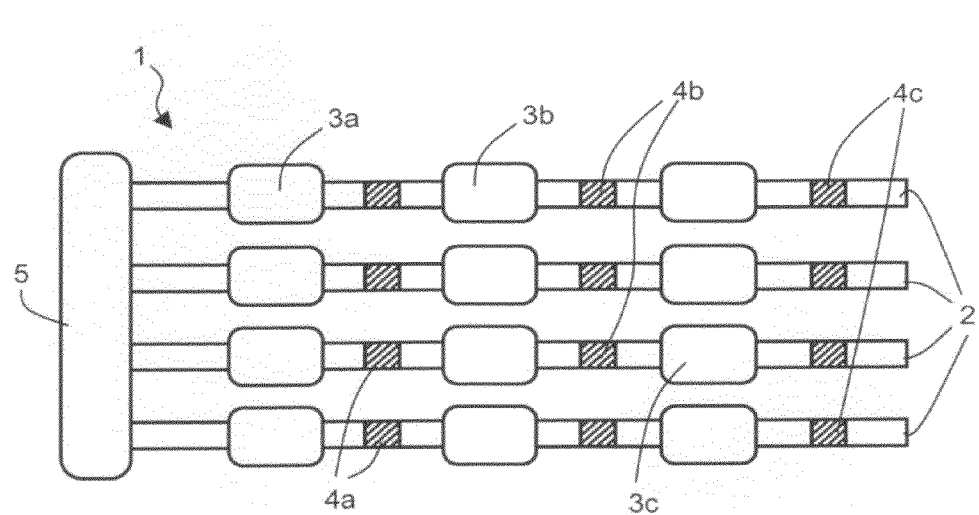
FIG. 1 schematically represents a microfluidic component designed to be controlled by a method for controlling the progression of a fluid according to the prior art.
Figure 2:
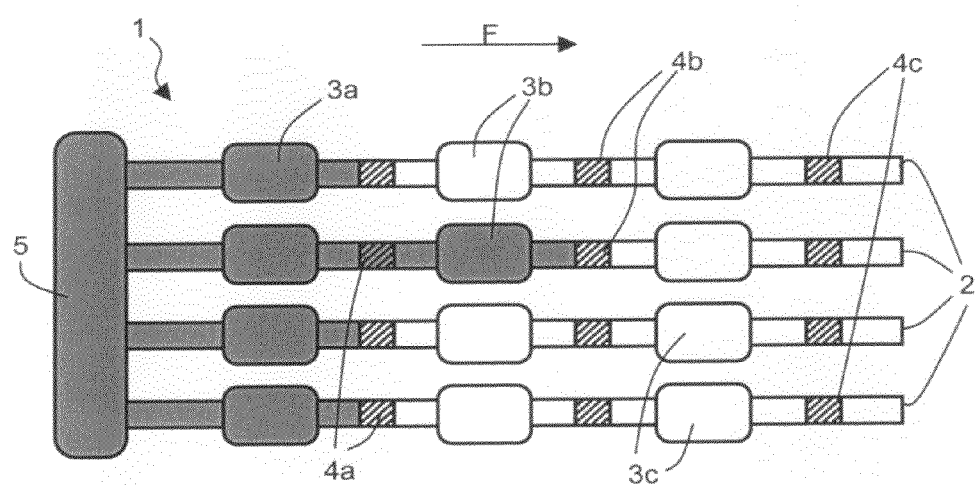
FIGS. 2 and 3 schematically represent the component according to FIG. 1, inside which the fluid is flowing.
Figure 3:
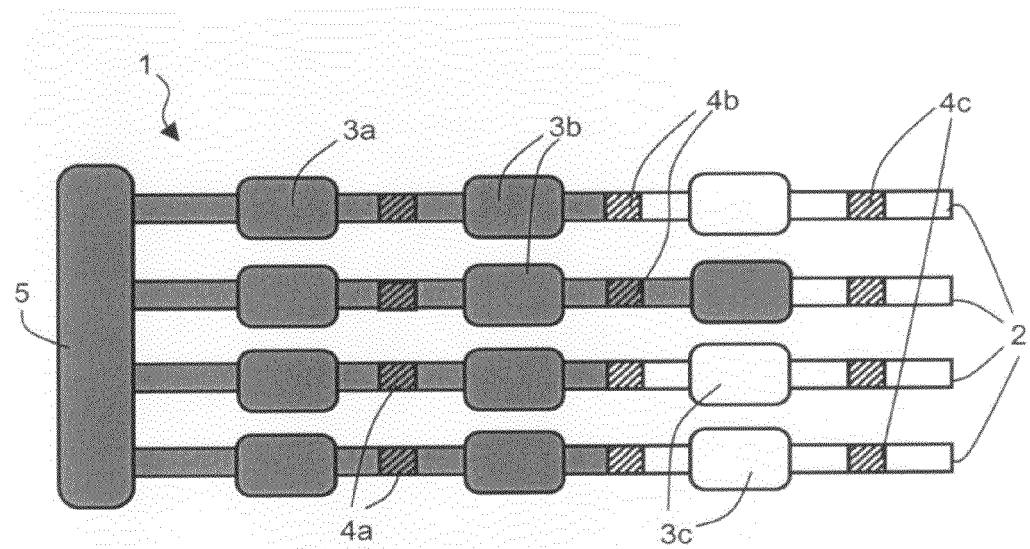
Figure 4:
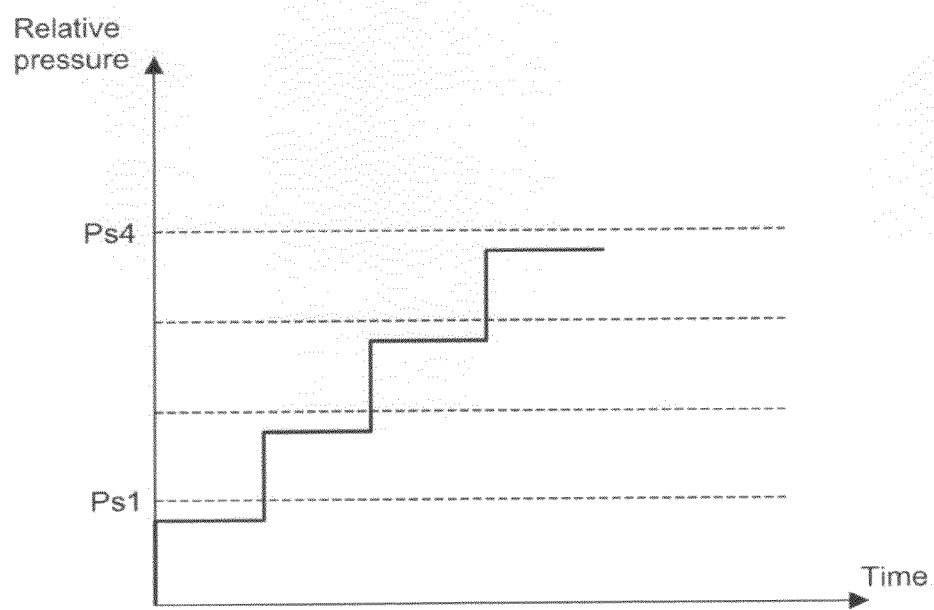
FIG. 4 is a plot representing the relative pressure versus time for a component controlled by a method according to the prior art.
Figure 5:
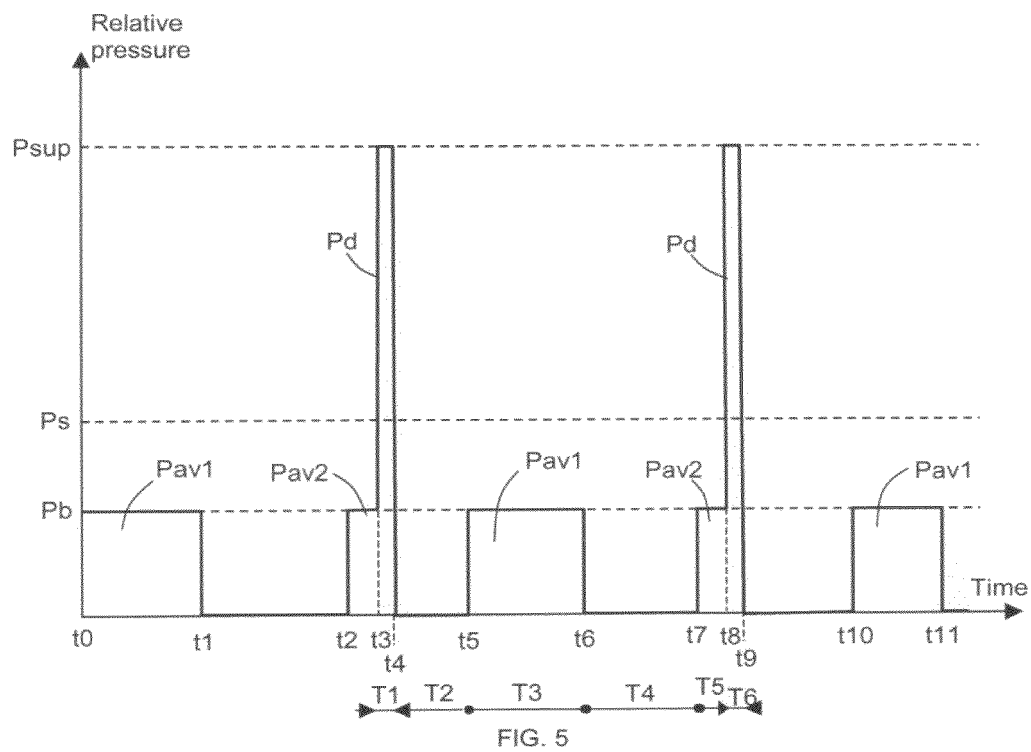
FIG. 5 is a plot representing the relative pressure versus time for a component controlled by a method for controlling the progression of a fluid according to the invention.
Figure 6:
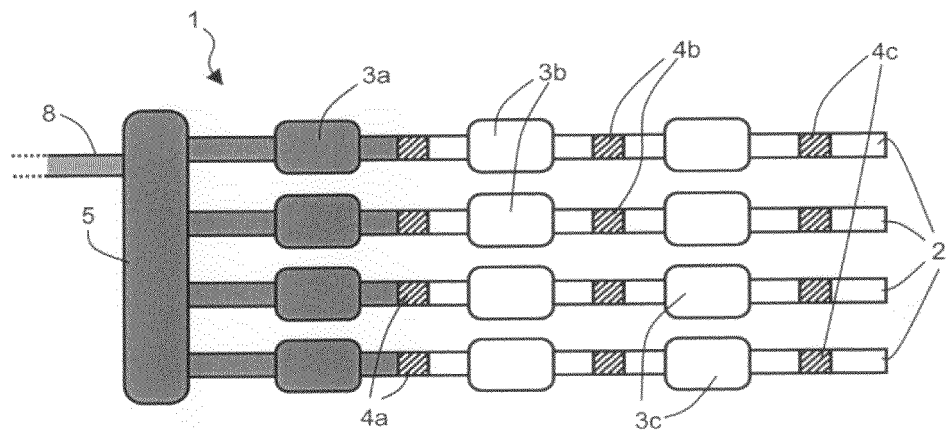
FIGS. 6 to 8 schematically represent a component controlled by the method according to FIG. 5.
Figure 7:
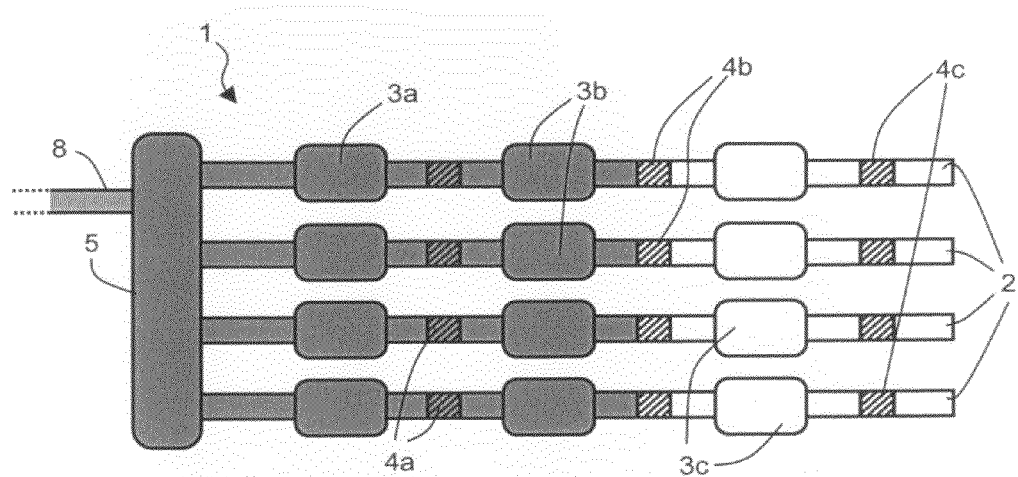
Figure 8:
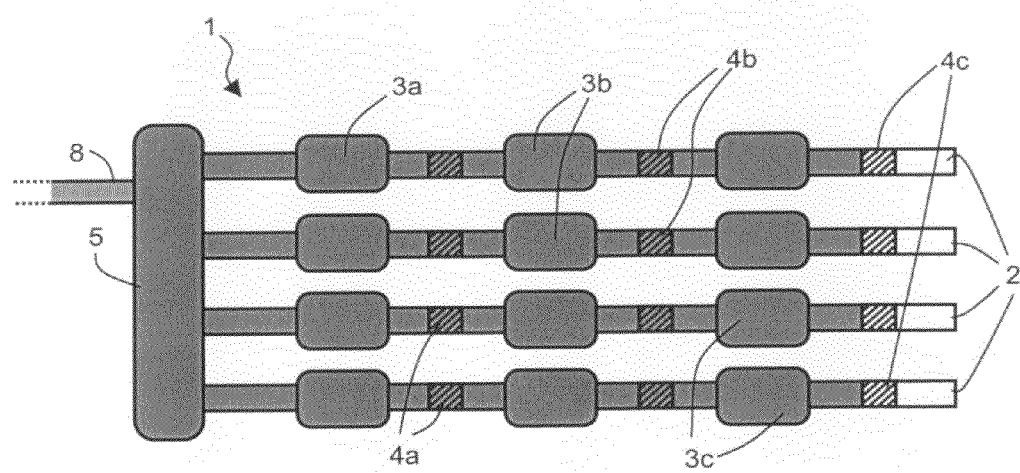

In the particular embodiment of FIGS. 5 to 9, microfluidic component 1 preferably comprises several microchannels 2 arranged in parallel, each microchannel 2 comprising an inlet connected to an inlet chamber 5 common to all the microchannels 2 (FIGS. 6 to 8). Component 1 is controlled in such a way that the fluid advances in synchronized manner in all the microchannels 2. Passive valves 4 and reaction or detection zones 3 of component 1 are preferably arranged in regular series spaced apart at regular preset intervals.

The method for controlling component 1 in particular enables passage of passive valves 4 of component 1 to be synchronized so that the passive valves allow the fluid to pass at the same time on all the microchannels 2 of component 1. The method controls the progression of the fluid according to the pressure difference between the inlet and outlet of component 1, i.e. between upstream and downstream of component 1.

Figure 9:
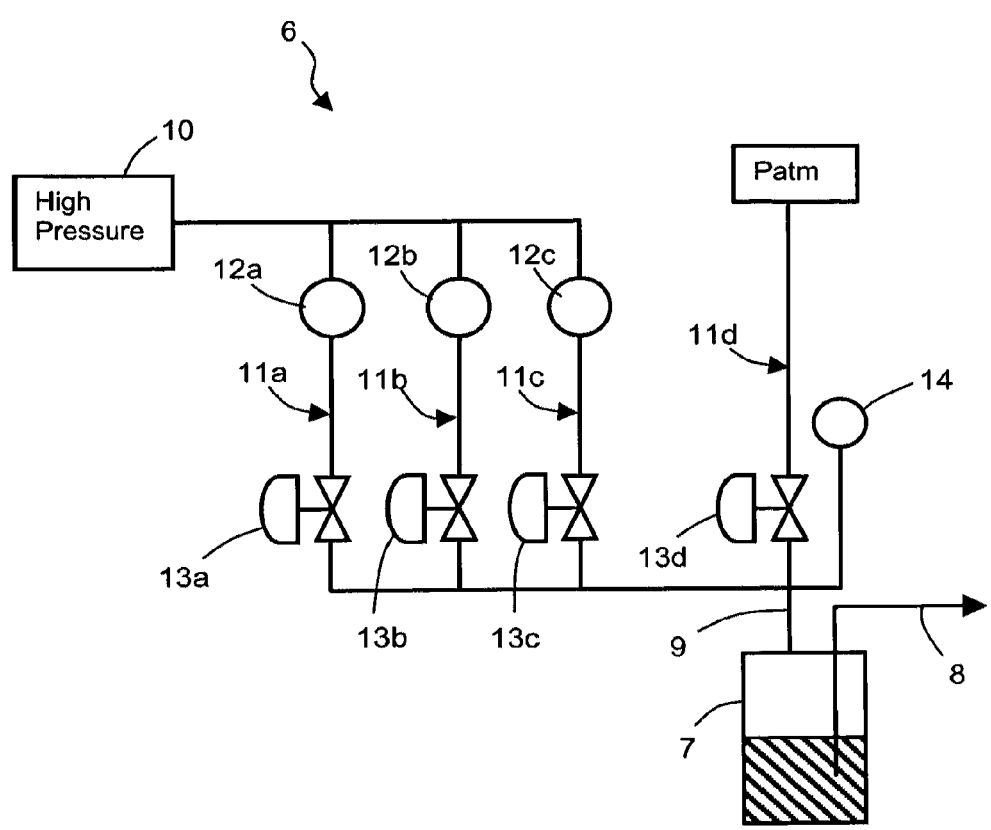
FIG. 9 schematically represent an automatic pressure control bench for implementation of the method according to FIGS. 5 to 8.

Component 1 is preferably empty at the outset, the fluid being fed for example by an outlet pipe 8 coming from a tank 7 (FIG. 9). The common inlet chamber 5 is completely filled and the pressure is identical in all the microchannels 2. The method controls progression of the fluid, i.e. progression of the interface between the fluid and the gas initially contained in component 1, by increasing the pressure difference between the inlet of component 1, defined by inlet chamber 5 in FIGS. 6 to 8, and the outlet of component 1, defined by the end of microchannels 2 in FIGS. 6 to 8.

In FIG. 5, the time scale and the scale of the relative pressure values have not been respected for the sake of clarity and legibility of the graph. The method consists in controlling the increase of the pressure difference between upstream and downstream of component 1 in discontinuous manner. The increase of the pressure difference pressure is controlled in the form of enabling pulses Pd unblocking passive valves 4 and of fluid advance periods Pav1, Pav2.

Each enabling pulse Pd corresponds to an abrupt variation of short time duration of the pressure difference between upstream and downstream of component 1. This variation passes via a maximum value Psup and drops back down to a level preferably close to zero. This value Psup is greater than the maximum threshold value Ps of all the threshold values Ps of passive valves 4 of component 1.

As represented in FIG. 5, each enabling pulse Pd presents a value Psup that is preferably very high compared with threshold value Ps of passive valves 4, in the case where passive valves 4 are all identical. In the case where passive valves 4 present different threshold values Ps due to their different geometric and/or wettability characteristics, the value Psup of enabling pulses Pd is then much higher than the maximum threshold value Ps of passive valve 4 of component 1 having the highest threshold value Ps of all the passive valves 4.

A continuous intermediate fluid advance period Pav1, taking place between the enabling pulses Pd, is designed to make the fluid advance to fill corresponding reaction or detection zones 3 of component 1. Each intermediate fluid advance period Pav1 is achieved by a pressure difference, preferably much smaller than the value Psup of an enabling pulse Pd and during a potentially much longer time.

In the particular embodiment of FIG. 5, the method for controlling component 1 comprises for example at least one compulsory intermediate fluid advance period Pav1 applied after an enabling pulse Pd, and at least one optional additional fluid advance period Pav2 applied just before an enabling pulse Pd, to ensure that microchannels 2 are completely filled, until the fluid is impeded by the corresponding passive valves 4.

During each fluid advance period Pav1, Pav2, the pressure difference applied between inlet and outlet of component 1 has a maximum base value Pb, lower than the minimum threshold value of passive valves 4 of component 1. The continuous intermediate fluid advance periods Pav1 must preferably bring the fluid up to contact with the following passive valves 4 to avoid application of the additional fluid advance periods Pav2.

A step of the biological protocol associated with reaction or detection zones 3 of component 1 has to be performed at zero pressure difference between a continuous intermediate fluid advance period Pav1 and possibly an additional fluid advance period Pav2. Should a fluid advance period Pav1 be conserved during the step of the associated biological protocol, certain passive valves 4 could in fact be preferentially passed, notably on account of the duration of the biological protocols carried out in reaction or detection zones 3. This would then give rise to errors as to the reliability of analysis, in particular on account of the loss of a part of the reaction volume. Such a zero pressure difference, as described above, thereby prevents any loss of integrity of the reaction volume during the biological protocol step performed in the corresponding reaction or detection zones 3.

For example, experimental resistance tests of passive valves 4 under pressure were performed with a biological buffer formed by the following elements: Tris pH8.5 40 mM, DMSO 15% vol., KCl 80 mM, MgCl2 12 mM, BSA 0.13 mg/mL. This buffer which is conventionally used in biology was injected into a microfluidic component comprising reaction or detection zones and passive valves with abrupt enlargement, with an opening diameter of 30 µm and a triggering pressure of around 70 mbar specific to this buffer. The component is regulated in temperature to 41° C. The filling pressure of the component is close to 30 mbar and this pressure is applied until the fluid is impeded on the enlargement valves.

Two experiments were then performed, in accordance with the table below, on the one hand bringing the pressure down to zero (first line of the table below) and on the other hand adjusting the pressure to its filling value (second line of the table below). The time (second column of the table below) is measured until the fluid is seen to appear in the following reaction or detection zone of the component, a sign that the fluid has passed the corresponding passive valve.

|  | Time until the fluid passes |
| --- | --- |
| Zero pressure | >1 hour (no valves passed during this time) |
| Pressure of about 30 mbar | <1 minute |

The table above gives the values of the time after which the fluid passed into the next reaction or detection zone of the component. It is therefore apparent from the above table that the time is much more than one hour when no pressure difference is applied in the component. The passive valves on the other hand only hold up the fluid for less than one minute when the pressure difference is kept at its filling value. The very great importance of the step described above, consisting in adjusting the pressure difference to a zero value, is therefore apparent from the above table, in order to optimize performance of the biological protocol steps in the reaction or detection zones of the component.

The control method will be described in even greater detail with regard to FIGS. 5 to 8. In FIGS. 6 to 8, component 1 for example comprises an inlet chamber 5, via which the fluid is inlet, common to all the inlets of microchannels 2. For example, a reaction or detection zone 3 has a volume of about 0.3 µl, with a depth of about 200 µm. The fluid considered in component 1 being water and all the passive valves 4 of component 1 being identical, a passive valve 4 is defined for example by an abrupt change of geometry of the associated microchannel 2. For example, a microchannel 2 presents a general diameter of about 500 µm and a narrowed diameter of about 100 µm defining passive valve 4. A passive valve 4 presents a threshold value Ps comprised for example between 5 mbar and 2 bar. The threshold value Ps of passive valves 4 is preferably about 20 mbar.

In the particular embodiment of FIGS. 6 to 8, control of the increase of the pressure difference between inlet and outlet of component 1 is performed upstream from component 1. Inlet chamber 5 is for example connected to a control device of the external pressure enabling the pressure difference between upstream and downstream of component 1 to be implemented (FIG. 9).

In FIG. 5, the first step of the method consists in applying a continuous intermediate fluid advance period Pav1, at base value Pb, between the times t0 and t1. This pressure difference Pb enables the first series of reaction or detection zones 3a to be filled, until the fluid is stopped by the first series of passive valves 4a, as represented in FIG. 6.

Between the times t1 and t2, the pressure difference must be zero in order to stop progression of the fluid. The biological protocol step corresponding to the first reaction or detection zones 3a is then performed preferably simultaneously in all the reaction or detection zones 3a of the first series. The biological protocol step performed in each reaction or detection zone 3a of one and the same series may be different depending on microchannels 2.

Between the times t2 and t3, an additional fluid advance period Pav2 may be applied, at base value Pb, just before enabling pulse Pd, in the case where the fluid has not completely filled microchannels 2 up to passive valves 4a following reaction or detection zones 3a.

Between the times t3 and t4, corresponding to a time period T1, a first enabling pulse Pd is applied in component 1. The value Psup of enabling pulse Pd is preferably very high compared with the threshold value Ps of passive valves 4a to 4c. The value Psup is for example comprised between 1 bar and 2.5 bar. The value Psup is preferably about 2 bar. The time T1 of enabling pulse Pd is very short and comprised for example between 100 ms and 500 ms. The time T1 is preferably about 350 ms.

In a general manner, the value Psup of enabling pulse Pd must allow systematic and preferably synchronized passage of all the passive valves 4 of the same series. Time period T1 of the enabling pulse Pd must be sufficiently long to enable this passage, but sufficiently short for the fluid to just have passed the corresponding passive valves 4 without completely filling the next reaction or detection zones 3.

Furthermore, the ratio of the value Psup of an enabling pulse Pd over the maximum threshold value Ps of passive valves 4 is greater than 1.25 and preferably comprised between 1.25 and 200. The ratio is preferably about 100 for a threshold value Ps of about 20 mbar and a value Psup of enabling pulse Pd of about 2 bar.

At time t4, corresponding to the end of period T1, the pressure difference is preferably adjusted to zero, so that enabling pulse Pd presents a zero lower value. Between times t4 and t5 corresponding to a time period T2, the pressure difference remains equal to zero. The time period T2 must be sufficiently long for the pressure to drop back completely to stop progression of the fluid. Time period T2 is for example about 500 ms.

In FIG. 5, the step of the control method described above is optional. It is possible for enabling pulse Pd to present a lower value equal to base value Pb so as to continue the progression of the fluid and to perform filling of the next reaction or detection zones 3b immediately after enabling pulse Pd.

Between times t5 and t6 corresponding to a time period T3, a continuous intermediate fluid advance period Pav1 is carried out. The object of this continuous intermediate fluid advance period Pav1 is to fill the next reaction or detection zones 3b (FIG. 7), i.e. those of the second series in the particular embodiment of component 1 represented in FIGS. 6 to 8.

In a general manner, each continuous intermediate fluid advance period Pav1 presents a sufficient maximum value to make the fluid advance, a value which is preferably equal to base value Pb and always lower than the minimum threshold value Ps of the set of passive valves 4. For example, the maximum base value Pb of a continuous intermediate fluid advance period Pav1 is comprised between 5 mbar and 100 mbar. Base value Pb is preferably about 15 mbar.

In FIG. 5, at time t6, continuous intermediate fluid advance period Pav1 presents a zero minimum value so as to stop the progression of the fluid in microchannels 2. Time duration T3 of a continuous intermediate fluid advance period Pav1 is for example about 60 s.

In a general manner, time period T3 of a continuous intermediate fluid advance period Pav1 must be sufficiently long for the fluid to be able to completely fill the corresponding reaction or detection zones 3 and to stop on the corresponding passive valves 4 for all the microchannels 2.

Furthermore, the ratio of time duration T1 of an enabling pulse Pd over time duration T3 of a continuous intermediate fluid advance period Pav1 is for example comprised between 0.1% and 1%. The ratio is preferably about 0.58%, for a time period T1 of about 350 ms and a time period T3 of about 60 s. In a general manner, time periods T1 and T3 are in particular chosen according to the pressure and geometry of component 1.

Furthermore, the time duration T3 of a continuous intermediate fluid advance period Pav1 can be determined according to signals supplied by at least one filling detector associated with microchannels 2 of component 1. The principle of the filling detector is based notably on detection of a change of the physical properties between the gas initially contained in microchannels 2 and the fluid.

For example, an optical filling detector can be used, arranged as an emitter and a receiver on the two sides of each microchannel 2. It is then possible to measure a change of the optical properties, in particular by determining the change from gas to fluid.

In another embodiment example, an electric filling detector can be used, two electrodes being arranged at the level of each passive valve 4. As the fluids used are conducting, the presence of the fluid can be detected by an abrupt change of the electrical conductivity between the two electrodes.

In FIG. 5, between times t6 and t7 corresponding to a time period T4, the step or steps of the biological protocol corresponding to the second series of reaction or detection zones 3b are performed (FIG. 7). The pressure difference must absolutely be zero between upstream and downstream of component 1, so as on the one hand to ensure a good synchronization of the progression of the fluid in all the microchannels 2, and on the other hand to prevent any loss of integrity of the reaction volume during the biological protocol step being performed. If fluid advance period Pav1 is kept during the associated biological protocol steps, certain passive valves 4 could preferentially yield to the pressure, as described above. This would then lead to losses of a part of the reaction volume.

Such a zero pressure difference, as described above, thereby prevents any loss of integrity of the reaction volume during the biological protocol step performed in the corresponding reaction or detection zones 3b. Time period T4 is for example comprised between 60 s and 3600 s. Time period T4 is preferably about 1800 s.

At time t7, an increase of the pressure difference is applied in microchannels 2 until base value Pb is reached. Between times t7 and t8 corresponding to a time period T5, additional fluid advance period Pav2 enables filling of microchannels 2 to be completed, until second series of passive valves 4b are reached. This step applies only when microchannels 2 are not completely filled, after continuous intermediate fluid advance period Pav1 carried out between times t5 and t6. Time duration T5 of an additional fluid advance period Pav2 is for example about 60 s.

In a general manner, time period T5 has to be sufficiently long for fluid to be able to stop on corresponding passive valves 4 in all the microchannels 2. Time period T5 of an additional fluid advance period Pav2 may further be determined according to signals supplied by at least one filling detector associated with microchannels 2 of component 1, as described above for determination of time period T3.

In FIG. 5, between times t8 and t9 corresponding to a time period T6, a new enabling pulse Pd is again applied in component 1 in particular in order to pass all the passive valves 4b of the second series in synchronized manner, as represented in FIG. 8.

Between times t9 and t10, a possible step of returning the pressure difference to zero can be applied. Then, between times t10 and t11, a new continuous intermediate fluid advance period Pav1 can be performed to fill the third series of reaction or detection zones 3c, as represented in FIG. 8.

The control method thus continues in this way all along microchannels 2 of component 1, with alternation between enabling pulses Pd to pass any subsequent passive valves 4 (not shown), fluid advance periods Pav1 and Pav2 to fill any subsequent reaction or detection zones 3 (not shown), and steps of returning the pressure difference to zero between two successive enabling pulses Pd, to perform the steps of the biological protocol.

Such a control method of a microfluidic component 1 thereby enables the progression of the fluid to be controlled, in particular in synchronized manner, on all of the microchannels 2 of component 1, while at the same time ensuring that the steps of the biological protocol are performed optimally due to zero resetting of the pressure difference during the method. The method is applicable whatever the characteristics of passive valves 4, whether they be identical or not, due to the preferably very high value Psup of enabling pulses Pd compared with the maximum threshold value Ps of all the passive valves 4.

This results in reliability of the analyses performed in reaction or detection zones 3 and reliability of general implementation of component 1. The influence of possible imperfections of microchannels 2 is eliminated.

In a general manner, the method for controlling the progression of the fluid in component 1, as described above, can be applied to a microfluidic component comprising a single microchannel 2. The method is then designed in particular to ensure systematic passage of a passive valve 4, whatever its characteristics and whatever the imperfections it may present, and to ensure that the conditions for performing the biological protocol steps are optimal.

In FIG. 9, a particular embodiment of an automatic pressure control bench 6 for implementation of the control method described above is represented. Bench 6 in particular enables the increase of the pressure difference between upstream and downstream of microfluidic component 1 to be controlled. Automatic pressure control bench 6 comprises a fluid tank 7 comprising an outlet 8 connected for example to inlet chamber 5 of component 1 (not shown in FIG. 9 for reasons of clarity) and an inlet 9 connected to a high pressure source 10, for example up to 4 bar.

High pressure source 10 comprises three circuits 11a, 11b, 11c in parallel each respectively equipped with a pressure-reducing gauge 12a, 12b, 12c and an electropneumatic valve 13a, 13b, 13c. Inlet 9 of tank 7 is also connected to atmospheric pressure Patm by a circuit 11d comprising a fourth electropneumatic valve 13d, circuit 11d being connected to the three circuits 11a, 11b, 11c in parallel. A pressure sensor 14 is connected to inlet 9 of tank 7 and to the four circuits 11a, 11b, 11c, 11d.

Such an automatic pressure control bench 6 in particular enables the method for controlling a microfluidic component as described above to be implemented, and pressure pulses as short as 100 ms to be controlled. Furthermore, electropneumatic valves 13a to 13d can be controlled by relays, themselves controlled by a micro-computer. This results in precise and calibrated pressure sequences being performed on inlet of the associated microfluidic component.

Moreover, time period T1 of an enabling pulse and time period T3 of a continuous intermediate fluid advance period Pav1 are chosen according to the characteristics of component 1, and more particularly according to the gas volume present in tank 7 of automatic pressure control bench 6, as described above.

The invention is not limited to the different embodiments described above. Passive valves 4 of component 1 can have different threshold values Ps from one another and can also have different geometrical characteristics, depending on their arrangements in microchannels 2.

Fluid advance periods Pav1 and Pav2, respectively during time periods T3 and T5, may oscillate between base value Pb and zero pressure difference value.

The number of microchannels 2, of reaction or detection zones 3 and of passive valves 4 is non-restrictive. It depends on the general size of component 1 to be controlled and/or on the biological protocols to be carried out.

A reaction or detection zone 3 of component 1 can further be defined by a portion of corresponding microchannel 2. Reaction or detection zone 3 then has the same dimensions as microchannel 2, but constitutes a particular portion thereof.

Figure 10:
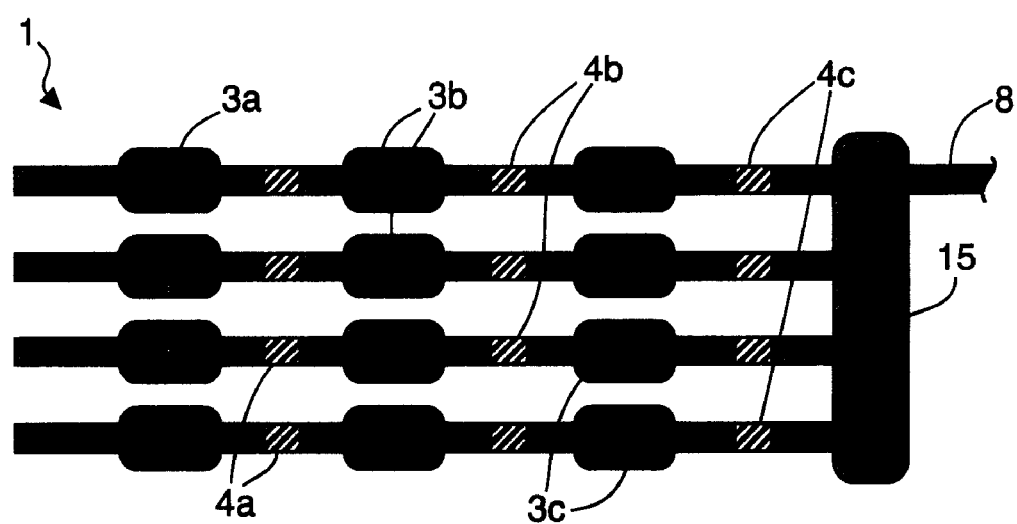
FIG. 10 schematically represents a microfluidic component designed to be controlled by a method for controlling the progression of a fluid according to an alternative embodiment.

In another alternative embodiment of the method for controlling the progression of the fluid in component 1 shown in FIG. 10, control of the increase of pressure difference between upstream and downstream of microfluidic component 1 can be performed downstream from microfluidic component 1. For example, movement of the fluid can take place by negative pressure by placing for example a vacuum source at the outlet of component 1. Microchannels 2 of component 1 then each comprise an outlet connected the vacuum source, which then defines an outlet chamber 15 common to all the microchannels 2.

An optional additional period of returning the pressure difference to zero can be performed between each additional fluid advance period Pav2 and each enabling pulse Pd (FIG. 5) in order to impede the progression of the fluid just before enabling pulse Pd. This additional period can for example have a duration of about 500 ms.

The invention claimed is:

1. A method for controlling the progression of a fluid from inlet to an outlet of a microfluidic component comprising:
providing the microfluidic component with a microchannel comprising a plurality of successive reaction or detection zones connected in series, a plurality of passive valves connected in series with the reaction or detection zones wherein each two successive reaction or detection zones in the microchannel are separated by one passive valve from the inlet to the outlet;
applying a plurality of pressure pulses comprising a first step at a first pressure difference between the inlet and the outlet of the microfluidic component during a first period, wherein the first pressure difference is higher than a threshold value for the passive valve so as to achieve progression of the fluid via the successive passive valves; and
applying a zero pressure difference between the inlet and the outlet of the component between two successive pressure pulses so as to stop progression of the fluid between two successive passive valves.

2. The method according to claim 1, wherein the duration of the pulse is from 100 ms to 500 ms.

3. The method according to claim 1, wherein the pressure difference is performed upstream from the microfluidic component.

4. The method according to claim 3, wherein the microfluidic component comprises a plurality of microchannels arranged in parallel, each microchannel comprising an inlet connected to a common inlet chamber, wherein the common inlet chamber is configured to apply an identical pressure in all the microchannels.

5. The method according to claim 1, wherein the pressure difference is performed downstream from the microfluidic component.

6. The method according to claim 5, wherein the microfluidic component comprises a plurality of microchannels arranged in parallel, each microchannel comprising an outlet connected to a common outlet chamber, wherein the common outlet chamber is configured to apply an identical pressure in all the microchannels.

7. The method according to claim 1, wherein the first pressure difference value of each pulse is higher than a maximum threshold value of the passive valves.

8. The method according to claim 7, wherein the ratio of the first pressure difference value of the pulse over the maximum threshold value of the passive valves is greater than 1.25.

9. The method according to claim 1, wherein the pulse comprises a second step at a second difference pressure value lower than a minimum threshold value of the passive valves.

10. The method according to claim 9, wherein the zero pressure difference is applied immediately after the second step and before the next pulse at the first difference pressure.

11. The method according to claim 9, wherein the second difference value is equal to 15 mbar.

12. The method according to claim 9, wherein the pressure pulse comprises a third step at a third difference pressure value lower than a minimum threshold value of the passive valves, the second step and the third step separated by the first step.

13. The method according to claim 12, wherein the duration of the second step or the third step is defined according to a signal supplied by one filling detector associated with each microchannel of the component.

* * * * *